(12) United States Patent
Petin et al.

(10) Patent No.: US 6,681,681 B2
(45) Date of Patent: Jan. 27, 2004

(54) VACUUM BOOSTER REAR BEARING

(75) Inventors: Bernard Petin, Dayton, OH (US); Patrick T. MacLellan, Huber Heights, OH (US); Michael A. Kasselman, West Chester, OH (US); Michel J. Vermoesen, Pittsfield, MA (US); Timothy G. Newman, Austin, TX (US)

(73) Assignee: Delphi Technologies, Inc., Troy, MI (US)

(*) Notice: Subject to any disclaimer, the term of this patent is extended or adjusted under 35 U.S.C. 154(b) by 96 days.

(21) Appl. No.: 10/036,879

(22) Filed: Dec. 26, 2001

(65) Prior Publication Data
US 2003/0116009 A1 Jun. 26, 2003

(51) Int. Cl.$^7$ .................................................. F15B 9/10
(52) U.S. Cl. ........................................ 91/376 R; 92/128
(58) Field of Search ................................ 92/13.3, 13.6, 92/128; 91/376 R

(56) References Cited

U.S. PATENT DOCUMENTS

| | | | | |
|---|---|---|---|---|
| 4,475,444 A | * | 10/1984 | Hendrickson | 91/376 R |
| 4,531,370 A | * | 7/1985 | Hendrickson et al. | 92/169.1 |
| 5,185,915 A | | 2/1993 | Osterday et al. | |
| 5,245,829 A | | 9/1993 | Osterday et al. | |
| 6,092,453 A | | 7/2000 | Preker | |
| 6,164,183 A | | 12/2000 | Fulks et al. | |
| 6,209,442 B1 | | 4/2001 | Haerr et al. | |

* cited by examiner

Primary Examiner—Edward K. Look
Assistant Examiner—Igor Kershteyn
(74) Attorney, Agent, or Firm—Scott A. McBain

(57) ABSTRACT

A power booster comprises a rear housing section and a piston. An inner bearing is disposed around the piston, and is adjustable relative to the rear housing section to translate the piston. A method of setting an axial dimension of the power booster is also provided.

21 Claims, 3 Drawing Sheets

US 6,681,681 B2

VACUUM BOOSTER REAR BEARING

TECHNICAL FIELD OF THE INVENTION

The invention relates to vacuum boosters for motor vehicles. More particularly, the present invention relates to a rear bearing for a vacuum booster or power brake.

BACKGROUND OF THE INVENTION

Power boosters operating on a pressure differential, such as exists between the engine intake manifold of a vehicle and the atmosphere, are well known devices. In the case of a single stage power booster, a shell-like housing typically encloses at least one variable pressure chamber that is separated from a vacuum chamber by a diaphragm and its supporting wall. The diaphragm and supporting wall are axially movable relative to the housing under variable pressure conditions. In order to achieve an increased boost effect, tandem power boosters have the interior of the housing subdivided by a housing divider wall separating a secondary variable pressure and vacuum chamber combination from the primary chamber pair. In all cases, a power piston is urged to move axially by the diaphragm(s) and actuates an output rod for operating the vehicle brakes through an engaged hydraulic master cylinder.

The master cylinder typically has bypass holes that must be covered, normally by primary and secondary seals, in order to develop hydraulic pressure in the brake line. To accommodate dimensional tolerances, the seals are usually situated some distance from the bypass holes. This distance gives rise to some travel in the vehicle brake pedal, which may be magnified by the remainder of the power booster.

SUMMARY OF THE INVENTION

The present invention is a power booster comprising a rear housing section and a power piston. An inner bearing is disposed around the power piston, and is adjustable relative to the rear housing section to translate the power piston.

Accordingly, it is an object of the present invention to provide a unique method of setting an axial dimension on a vacuum booster and/or adjusting a power brake.

Another object of the present invention is to provide a power booster of the type described above that reduces travel loss while the assembly is still in the assembly plant.

Still another object of the present invention is to provide a power booster of the type described above that reduces initial travel loss at the vehicle pedal.

Still another object of the present invention is to provide a power booster of the type described above that minimizes or avoids any need to adjust the end fitting of the output rod before attachment to the master cylinder.

These and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENT

Figure 1:
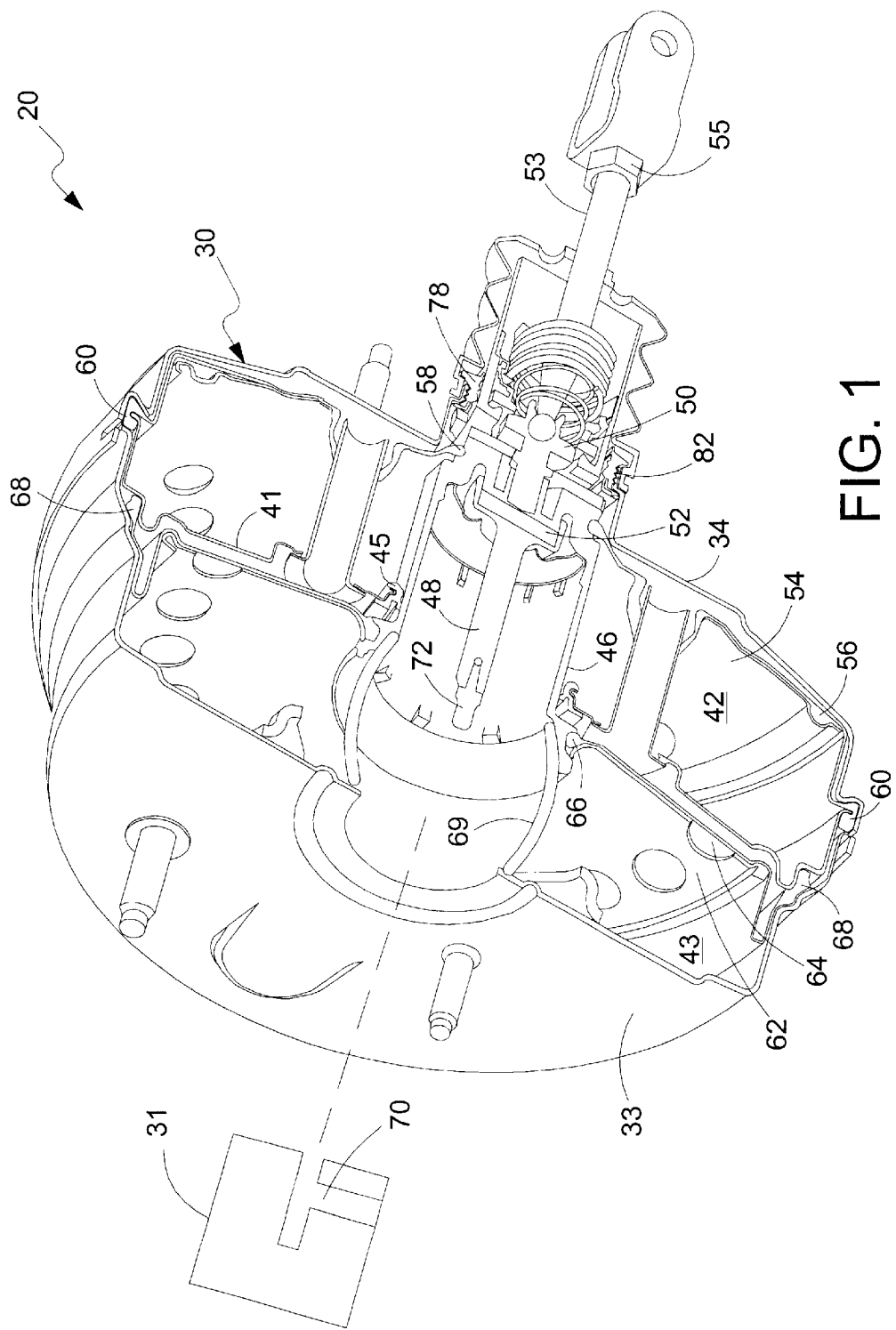
FIG. 1 is a perspective view of a power booster according to the present invention cut away to expose the interior of the power booster.

FIG. 1 shows a power brake assembly 20 according to the present invention. The power brake assembly 20 includes a power booster 30 and a master cylinder 31 supported therewith. Power booster 30 has a substantially open internal cavity formed by mating a front housing section 33 and a rear housing section 34. In a preferred embodiment, the power booster 30 is a tandem booster such that a housing divider wall 41 separates the internal cavity into primary and secondary chambers 42 and 43, respectively.

Housing divider wall 41 includes an inner edge that carries an annular seal 45. A secondary portion 46 of a power piston extends through the annular seal 45, and is slidable forwardly and rearwardly to actuate the master cylinder 31 through an output rod 48. The annular seal 45 acts as a bearing for supporting the secondary portion 46 of the power piston in the lateral direction. The secondary portion 46 of the power piston is engageble with a primary portion 50 of the power piston through a rubber reaction disk 52, while the primary portion of the power piston engages a push rod 53 that is axially adjustable with a nut 55. The push rod 53 in turn is engaged with a brake pedal (not shown).

A primary support wall 54 supports a primary diaphragm 56. The primary diaphragm 56 includes an integral inner annular seal 58 that engages the rear of the power piston 46, and an integral outer annular seal 60 that engages housing divider wall 41 and the rear housing section 34. The primary diaphragm 56 separates primary chamber 42 into a variable pressure compartment and a vacuum compartment. Similarly, a secondary support wall 62 supports secondary diaphragm 64. The secondary diaphragm 64 includes an integral inner annular seal 66 that engages the front of the secondary piston 46, and an integral outer annular seal 68 that engages the housing divider wall 41 and the front housing section 33. The secondary diaphragm 64 separates secondary chamber 43 into variable pressure and vacuum compartments similar to those defined by the primary diaphragm 56.

As is well known, a vacuum pressure is generated, by engine intake vacuum or by a supplementary source, in the primary and secondary vacuum compartments when the push rod 53 is actuated. A variable pressure developed in the associated variable pressure compartments by the introduction of atmospheric air through an air valve selectively creates a force on the respective diaphragms 56 and 64, which the support walls 54 and 62 then apply to the power piston 46. In response, the power piston 46 compresses a return spring 69, and the output rod 48 applies force to the master cylinder 31. The vacuum drawn from the power booster 30 may thereafter exit through a vacuum check valve (not illustrated) in the front housing section 33.

Figure 2:
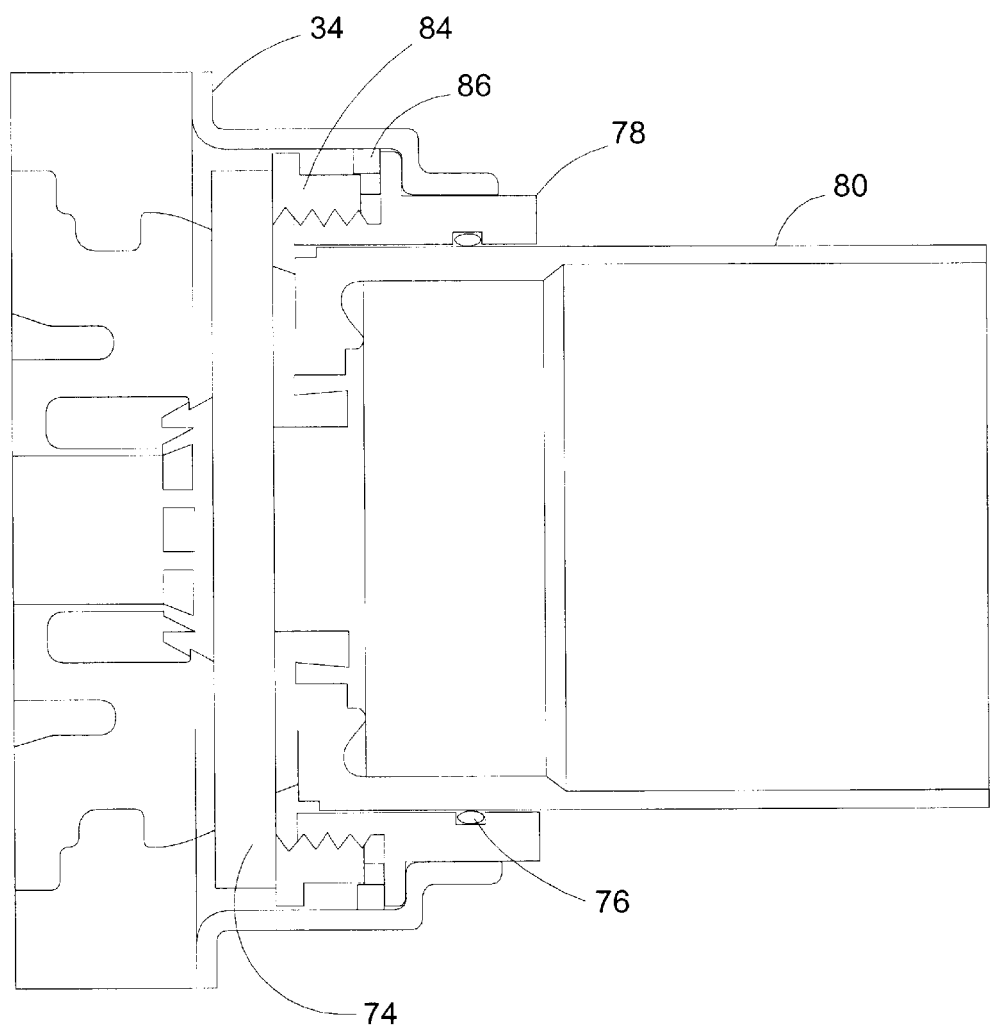
FIG. 2 is a cross-sectional view of a portion of an alternative embodiment of the power booster.

A cap 72 on the end of the output rod 48 engages a master cylinder primary piston, which engages a seal to cover a bypass hole 70 in the master cylinder 31 during brake application. In order to minimize the distance that the cap 72 must travel to accomplish this, the axial position of the output rod 48 may be preset during assembly. FIG. 2 shows an adjustable rear bearing portion of the power booster including the primary portion 50 of the power piston, a clip 74, and the output rod 48. A seal 76 is disposed in an inner bearing 78, which in turn is disposed around a piston housing 80.

The inner bearing 78 includes an externally threaded front end that is adjustably engaged, in the embodiment shown in FIG. 1, with internal threads formed on a rear portion 82 of the rear housing section 34. In an alternative embodiment shown in FIG. 2, the external threads of the inner bearing 78 are adjustably engaged with an internally threaded rear end of an outer bearing 84. In this alternative embodiment, a plastic locking ring 86 press fit into the rear housing section 34 provides interference to prevent rotation of the outer bearing 84.

Figure 3:
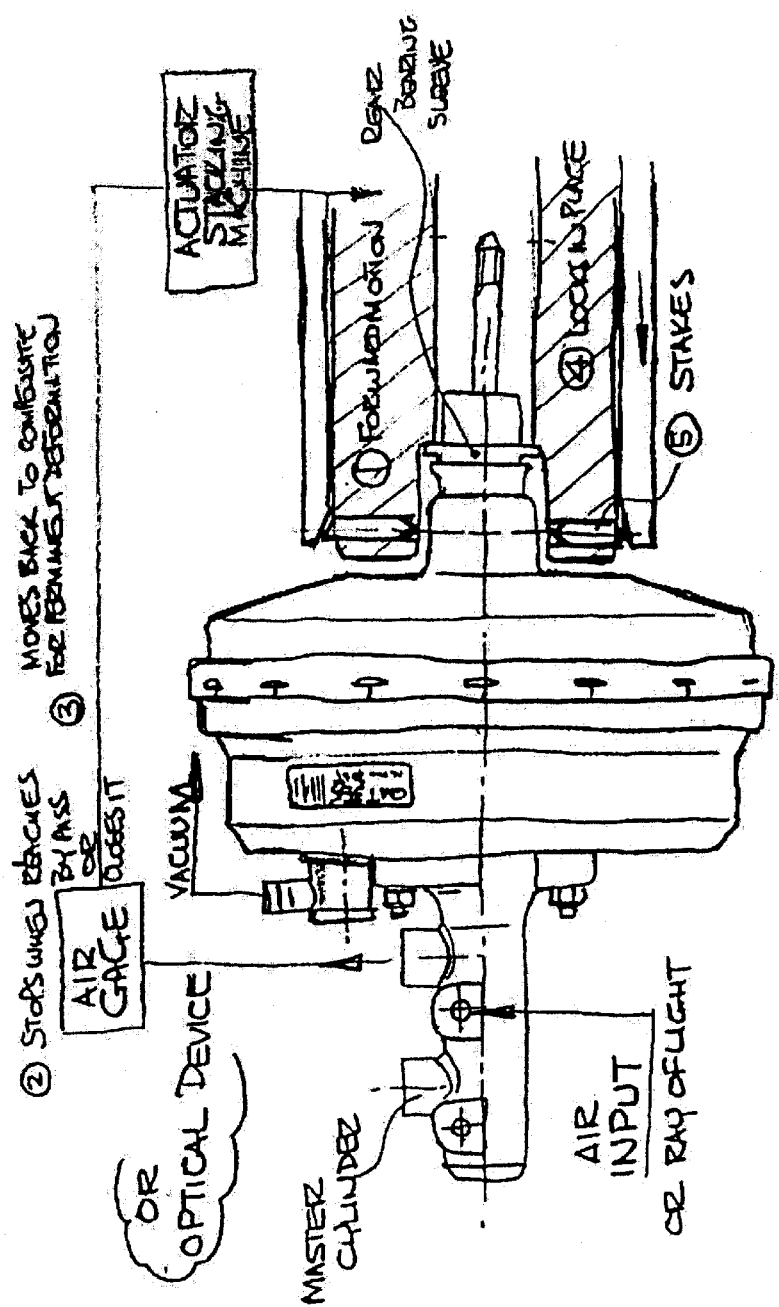
FIG. 3 is a schematic view of a staking machine for implementing a method according to the present invention.

In either embodiment the threaded portions, normally in the assembly plant, are moved relative to each other to translate the internal booster assembly along a central or "X" axis. For a booster alone, the adjustment may be made to set the 'X' dimension of the booster for the gage dimension of the master cylinder using a hard gage on the front housing of the booster while under vacuum. In the case of a power brake, including the vacuum booster and the master cylinder 31 as shown in FIG. 3, this adjustment may be made using either air pressure through the outlets of the master cylinder with detection of seal opening or closure at the bypass holes 70, or through optically sensing the seal covering or opening the bypass holes using light. Regardless, the adjustment of the rear bearing is normally moved rearwardly to back the edge of the seal of the master cylinder past the bypass hole.

The adjustable booster is secured, preferably with an anaerobic glue placed on the threads of the rear bearing components, when the desired position is achieved. As an alternative to threads, the rear bearings may be provided with relatively inclined surfaces or a ratcheting-type mechanism. In any event, the present invention also contemplates that the device may be locked in place with a crimping, staking or rolling operation.

This unique method of setting the 'X' dimension on a vacuum booster and/or adjusting the power brake has several advantages. For instance, the present invention significantly reduces travel loss while the assembly is still in the assembly plant. The result may be as much as an 8 to 10 millimeter reduction in initial travel loss at the pedal on vehicles with large pedal ratios and a center port compensation master cylinder. This may also improve response time of the vehicle to build pressure, and reduce stopping distance. Additionally, any need to machine the cap 72 may be avoided.

It should be appreciated that the above-described embodiments of this invention are exemplary only. For instance, the present invention is applicable in ordinary boosters as well as in lightweight boosters. Various other improvements and modifications to this invention may occur to those skilled in the art and those improvements and modifications will fall within the scope of this invention as set forth below.

What is claimed is:

1. A power booster comprising:
   a rear housing section;
   a piston;
   an inner bearing disposed around the piston, the inner bearing being adjustable relative to the rear housing section to translate the piston; and
   an outer bearing disposed between the rear housing section and the inner bearing.

2. The power booster of claim 1 wherein the inner bearing is threadingly engaged with the rear housing section.

3. The power booster of claim 1 wherein the inner bearing is threadingly engaged with the outer bearing.

4. The power booster of claim 1 further comprising a locking ring disposed between the outer bearing and the rear housing section.

5. The power booster of claim 1 wherein the inner bearing is securable to the rear housing section.

6. The power booster of claim 1 wherein the inner bearing is securable to the rear housing section with an anaerobic glue.

7. A power booster comprising:
   a rear housing section;
   a piston disposed in a housing and defining an axis;
   an inner bearing disposed around the piston, the inner bearing being adjustable relative to the rear housing section to move the piston along the axis; and
   an outer bearing disposed between the rear housing section and the inner bearing.

8. The power booster of claim 7 wherein the inner bearing is threadingly engaged with the rear housing section.

9. The power booster of claim 7 wherein the inner bearing is threadingly engaged with the outer bearing.

10. The power booster of claim 7 further comprising a locking ring disposed between the outer bearing and the rear housing section.

11. The power booster of claim 7 wherein the inner bearing is securable to the rear housing section.

12. The power booster of claim 11 wherein the inner bearing is securable to the rear housing section with an anaerobic glue.

13. A power brake comprising:
    a booster having a rear housing section;
    a master cylinder connected to the booster;
    a piston disposed in a housing and defining an axis;
    an inner bearing disposed around the piston, the inner bearing being adjustable relative to the rear housing section to move the piston along the axis; and
    an outer bearing disposed between the rear housing section and the inner bearing.

14. The power boaster of claim 13 wherein the inner bearing is threadingly engaged with the rear housing section.

15. The power booster of claim 13 wherein the inner bearing is threadingly engaged with the outer bearing.

16. The power booster of claim 13 further comprising a locking ring disposed between the outer bearing and the rear housing section.

17. A method of setting an axial dimension of a power booster, the method comprising:
    providing a piston disposed within an inner bearing;
    providing an outer bearing adjustably engaged with the inner bearing;
    adjusting the inner bearing relative to a rear housing section to translate the piston; and
    staking the rear housing section to set the axial dimension.

18. A power booster comprising:
    a rear housing section;
    a piston; and
    an inner bearing disposed around the piston, the inner bearing being adjustable relative to the rear housing section to translate the piston, wherein the inner bearing is securable to the rear housing section.

19. The power booster of claim 18 wherein the inner bearing is securable to the rear housing section with an anaerobic glue.

20. A power booster comprising:

a rear housing section;

a piston disposed in a housing and defining an axis; and an inner bearing disposed around the piston housing, the inner bearing being adjustable relative to the rear housing section to move the piston along the axis, wherein the inner bearing is securable to the rear housing section.

21. The power boaster of claim 20 wherein the inner bearing is securable to the rear housing section with an anaerobic glue.

* * * * *